Oct. 5, 1965
C. J. T. YOUNG
3,210,552
APPARATUS FOR INDICATING PRESENCE OF
PREDETERMINED COLOR IN SAMPLE
Filed Dec. 2, 1960
3 Sheets-Sheet 2
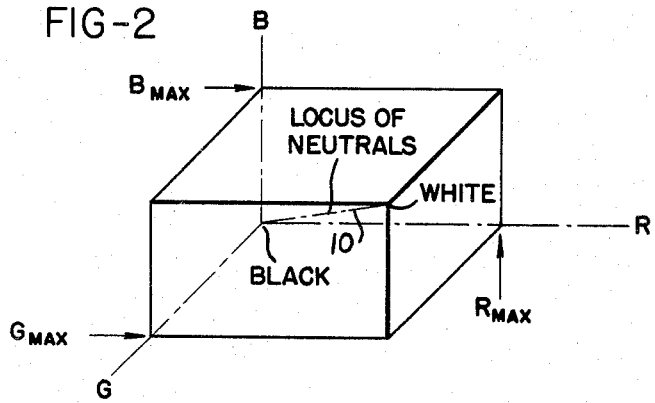
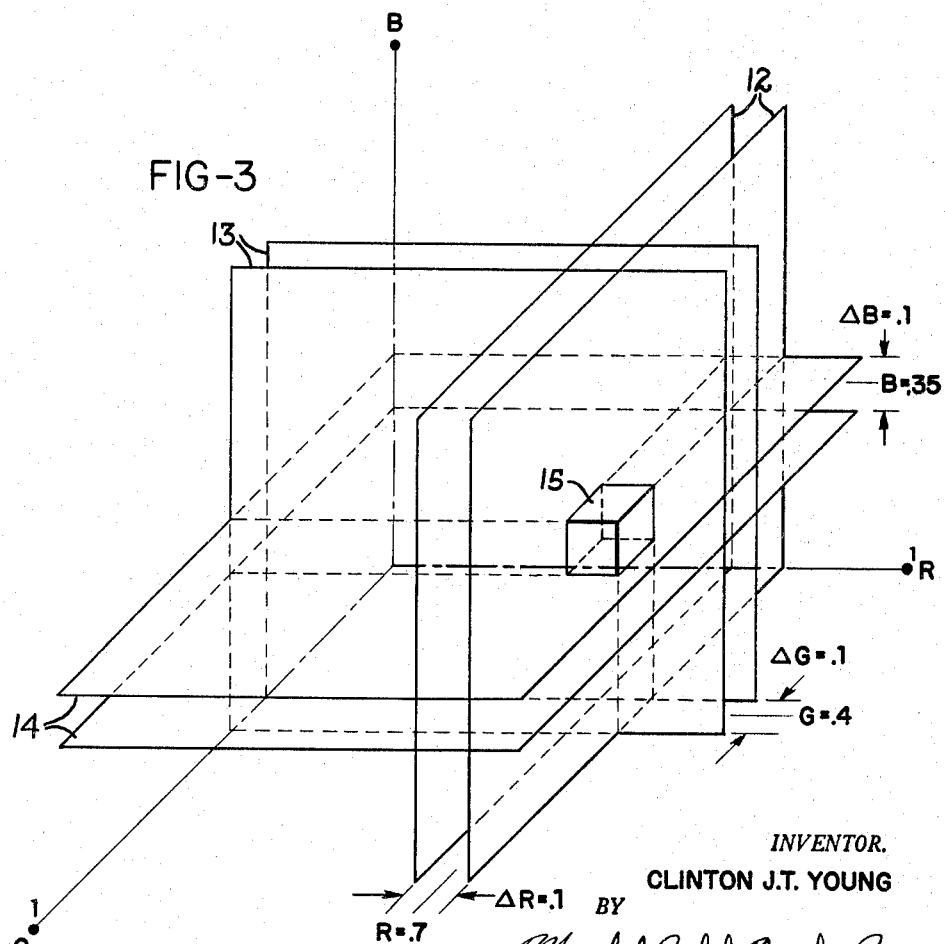
INVENTOR.
CLINTON J.T. YOUNG
BY
Marechal, Biebel, French & Bugg
ATTORNEYS Oct. 5, 1965
C. J. T. YOUNG
3,210,552
APPARATUS FOR INDICATING PRESENCE OF
PREDETERMINED COLOR IN SAMPLE
Filed Dec. 2, 1960
3 Sheets-Sheet 3
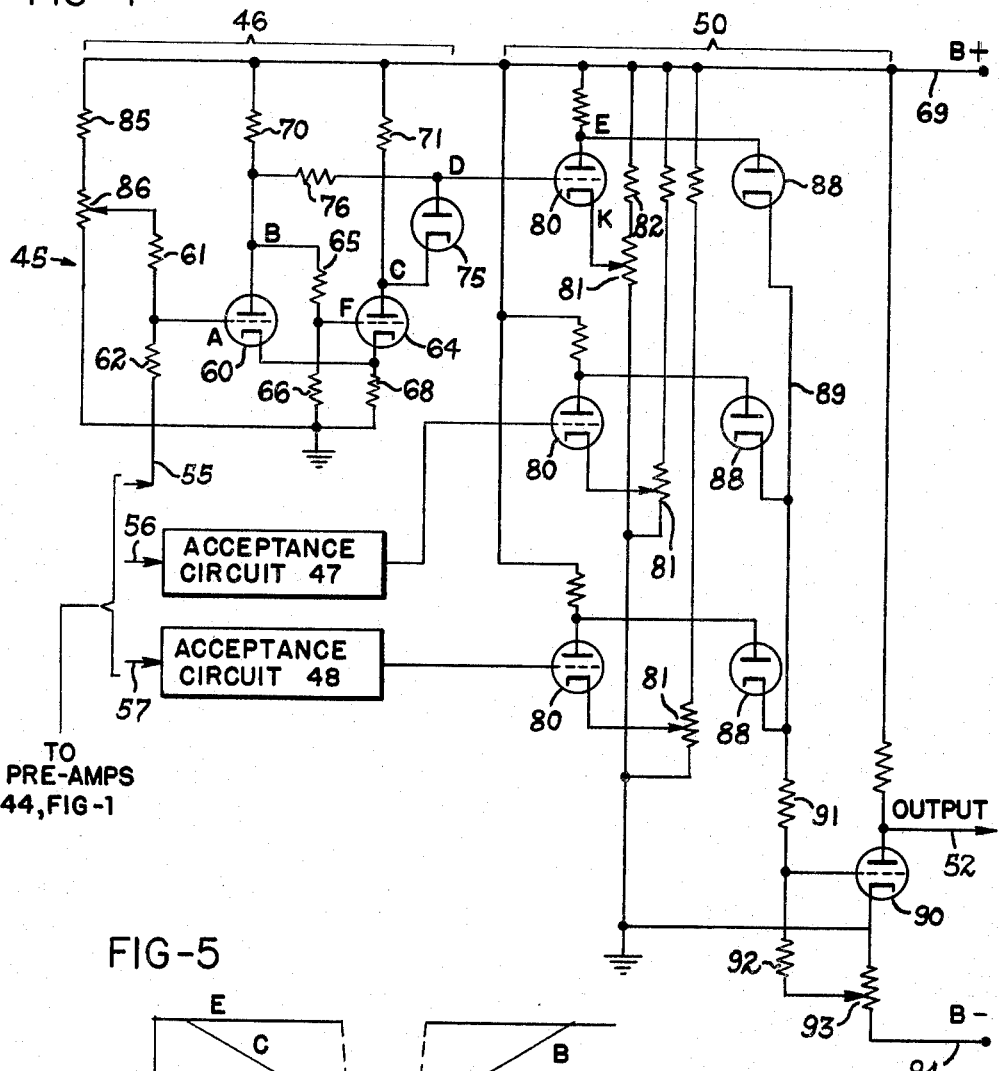
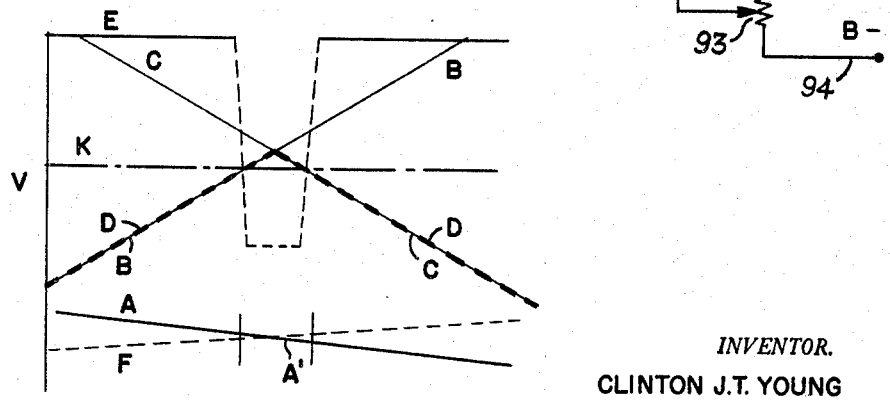
INVENTOR.
CLINTON J.T. YOUNG
BY
Marechal, Biebel, French & Bugg
ATTORNEYS

United States Patent Office 3,210,552
Patented Oct. 5, 1965

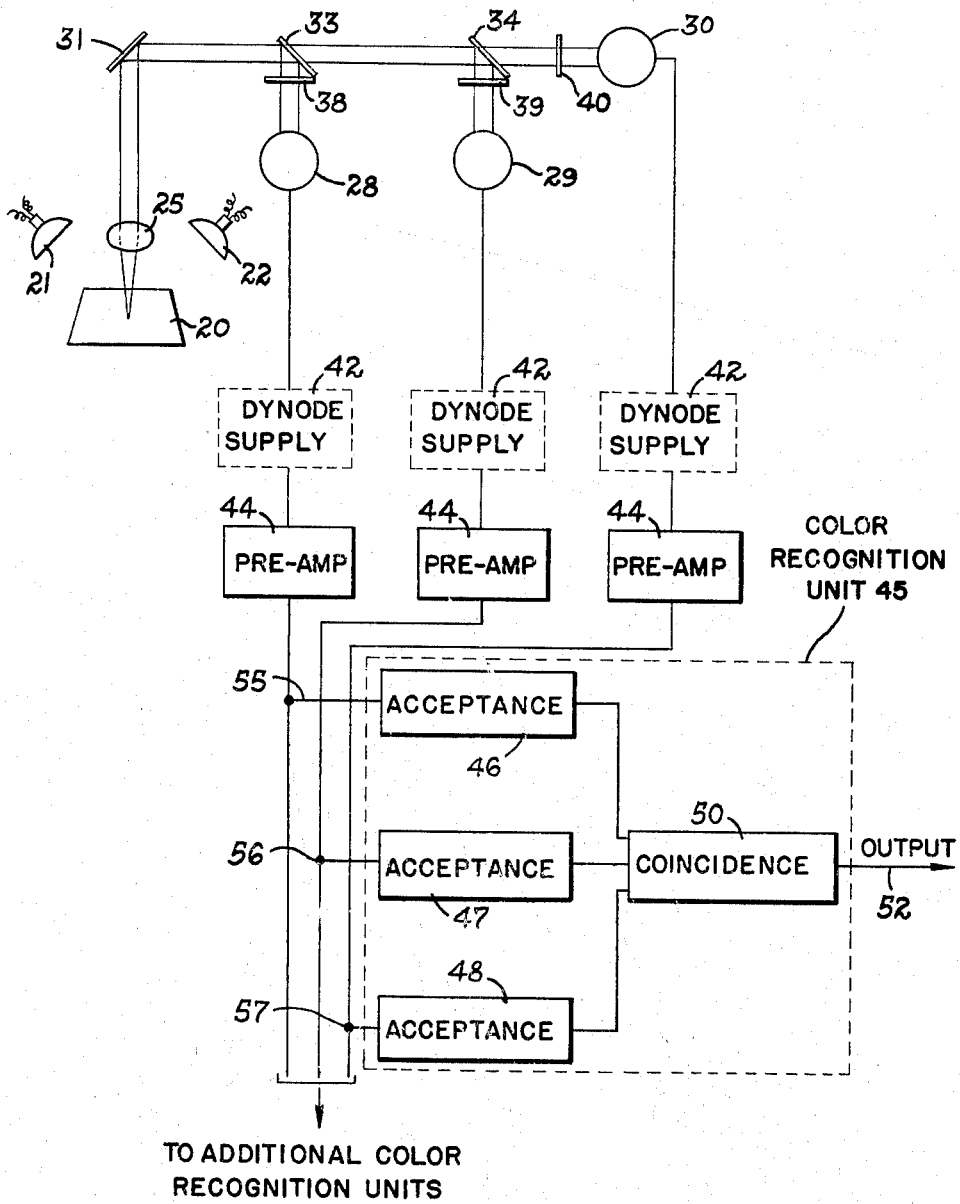

3,210,552
APPARATUS FOR INDICATING PRESENCE OF PREDETERMINED COLOR IN SAMPLE
Clinton J. T. Young, Alexandria, Va., assignor to Outlook Engineering Corporation, Alexandria, Va., a corporation of Virginia
Filed Dec. 2, 1960, Ser. No. 73,281
5 Claims. (Cl. 250—226)

This invention relates to the science of color detection and more particularly to apparatus and methods for recognizing the occurrence of a color within a defined range of colors.

This invention provides a method and apparatus for the recognition of a desired color in a range of colors in a sample or a portion of a sample under inspection. The preferred practice of the invention employs three electrical transducers, each of which is adapted to respond to a different component of light from the sample, although two transducers may be employed under circumstances where it is known that only two variables are present, such as hue and saturation, with luminance or brightness constant. However, in circumstances where three parameters are variable, three such photoresponsive devices are employed and preferably consist of photomultiplying tubes.

The output of each of the tubes is applied to separate acceptance circuits which provide an output only when their inputs are within predetermined and preferably adjustable ranges. Any input resulting from an excitation of one of the photomultiplying tubes which results in a voltage either higher or lower than the predetermined range for the desired color component results in no signal through the associated acceptance circuit. The outputs of the acceptance circuits are applied to a coincidence circuit which provides an output only when it receives simultaneous inputs from each of the acceptance circuits. This output therefore indicates the presence of the desired color in the sample being observed.

Provision is included for the adjustment of the band widths of the acceptance circuits and the level of response for each of such circuits in order to define a small space or element of color within the color solid which will be recognized by the system. This space is of adjustable volume and dimension. The system thus has the advantage of being fully adjustable to recognize the occurrence of any color within the coordinates defined by the chosen primary colors at the transducers. In operation, a sample having the desired color is placed for inspection by the system and the controls are set to effect a recognition thereof, and the system then operates to provide an output upon the occurrence of such desired color in each of the subsequent samples presented to the system for inspection. Thus, the system is not affected by variations in sensitivity of the transducers or in the transconductance of the other tubes and the like since the system itself memorizes the desired color.

A further advantage of the invention resides in the employment of more than one set of acceptance and coincidence circuits, referred to as color recognition units, which may be separately adjusted to recognize variations within the same desired color or different colors. The invention has particular utility in the recognition of a particular color which is printed on a surface, such as ink on paper, wherein there may occur a range of densities of the ink of a given color or an overprinting of the desired ink with an ink of a different color. Thus the invention is particularly useful for detecting colors with the rapid scanning system disclosed and claimed in the copending application of Young, Serial No. 73,282, filed concurrently herewith and assigned to the same assignee as this application, now Patent No. 3,120,577.

It is therefore a principal object of this invention to provide a color recognition system and method as outlined above employing multistimulus responsive devices having outputs applied to acceptance and coincidence circuits.

A further important object of this invention is to provide a system and method as outlined above which is adjustable to recognize a desired color by subjecting the system to light from a known sample, adjusting the controls to effect recognition, and then presenting the light from an unknown sample for recognition.

Another object of this invention is the provision of a color recognition system as outlined above which is adjustable to recognize a predetermined three dimensional element within a color solid.

A still further object of this invention is the provision of a color recognition system as outlined above which may be adjusted to recognize a desired color over a range of linear variation of the color in saturation or lightness, or which may be adjusted to detect the overprinting of a desired color with another color, or both.

A still further object of this invention is the provision of a color recognition system as outlined above characterized by its simplicity and adjustability to recognize any color lying within the coordinates of the chosen primary colors.

A further object of this invention is the provision of a system as outlined above which may be adjusted to recognize more than one color simultaneously.

Other objects and advantages of the invention will be apparent from the following description, the accompanying drawings and the appended claims.

In the drawings:
FIG. 1 is a diagram of the system of the invention;
FIG. 2 is a diagram of a color solid formed by the coordinates of the outputs of the photoresponsive tubes;
FIG. 3 is an enlarged diagram similar to FIG. 2 which illustrates the manner in which a space containing a range of colors is defined by a limited range of the outputs of the transducers;
FIG. 4 is an electrical schematic diagram of one of the color recognition units; and
FIG. 5 is a voltage diagram.

Any color in a sample can be defined in terms of three primary colors, the definition being a statement of how much of each of the primary color is required to form a mixture that matches the sample. The set of primaries most widely used in color theory is that corresponding to the tristimulus values for a standard observer adopted by the International Commission on Illumination. In this invention there is no human observer but, instead, use is made of three sets of tristimulus values determined by the properties of three optical-electrical transducers. In the preferred embodiment of the invention, these include three photomultiplier tubes which are caused to have different spectral responses. The responses may be different because of differences in their photocathodes or because of modification of the light reaching them, as by use of optical filters, or both.

It is not quite accurate to speak of the responses of such transducers as exact amounts of primaries in the color under observation. To do so would suppose that light not producing response in one would be used in another so that there could be, theoretically, a reversible mixing or separation of required amounts of the primaries. If one skilled in the art had data on the responses of the transducers and on the method of dividing light among them, he could specifiy the primaries which they represent; but for an understanding of the present invention it is sufficient to describe only the outputs of the transducers, for any combination of these uniquely indicates the observation of some color.

In principle, the spectral responses of the three transducers may be almost any as long as they are not identical. For practical reasons, however, it is desirable that they be markedly different; this gives larger differences in outputs for different colors so that they may be more readily distinguished by the electrical circuits which follow. Having these responses widely different in chromaticity also leads to marked output signal differences over a wide range of colors. In fact, this invention is not limited to "color," in the visual sense; and spectral responses beyond visible range may be considered. This can be important both for recognizing invisible spectral distributions (which are analogous to visible colors) and as a means of enhancing differences in response when only visible colors are important. The reason for the latter is that in many cases high or low reflectivity near the end of the visible spectrum of a substance or sample is continued as a trend beyond the limit of visibility.

For most purposes three spectral response curves reasonably well separated in the visible region are satisfactory. In the preferred embodiment the three transducers have spectral responses predominantly in the red, green and blue; and their outputs are designated as R, G, and B respectively.

FIG. 2 illustrates a color space or solid defined by three such outputs. $R_{max}$, $G_{max}$, and $B_{max}$ are the responses of the three transducers when a white sampler is under observation with a given illumination. If the example being considered is limited to real colors, then only positive amounts of the primaries need be considered, and there will be no response less than zero. On the other hand, since a white sample, either transmitting or reflecting, with diffusivity assumed constant, absorbs no light, there can be no responses greater than the maximum designated. All possible colors therefore are located within the parallelepiped shown. Variation of all three responses in proportion shows no change in chromaticity, but only in brightness. Therefore any straight line 10 through the origin is a locus of colors of the same chromaticity but varying brightness; in particular, the line 10 to the point defined by the three maxima is the locus of neutrals running from black at the origin to white at the outer end.

Three coordinates, i.e., reference to three transducers of different spectral sensitivities, are necessary and sufficient to define a color at a specified chromaticity and luminance. There are, of course, cases where only certain colors are present when adequate discrimination could be obtained with less than three transducers. On the other hand, there may be cases involving fine discrimination in which improved results can be obtained with the photoelectric signals actually available if more than three coordinates and transducers are used.

FIG. 3 illustrates the manner in which a limited range of colors is defined according to this invention by a limited range of each of the three signals. In this figure the possible ranges have been normalized by adjusting scale factors so that the maximum value of each signal as seen on exposure to white is plotted as 1. A sample color has been assumed to be defined by $R=.7$, $G=.4$, and $B=.35$. For purposes of practical recognition, it is desired to allow some variation of the color; this is done by allowing some variation in each of the coordinates. There is no reason why the tolerances must be equal, but in this example they all are drawn as ±.05. This establishes three orthogonal pairs of planes 12, 13 and 14 in color space which, together, define a color element or space 15 which is .1 on a side with its center at the nominal color .7R, .4G and .35B.

Sometimes a color of the sample, such as the color of ink printing on paper, may be present in different places with different densities, all of which should be recognized as representing the same color. This will mean that the element of desired color in the three dimensional space is elongated. A dense layer of ink will lie at one point in color space; unless the color is strongly dichromatic, all lighter printings will lie close to the line joining that point and white. One means of recognizing all of these range of densities is to use several color recognition units set for different regions of color space along the line. Another that will be applicable in some cases is to relax the tolerances of one or more acceptance circuits, i.e., to extend the dimensions of the acceptable color element 15 in one or more dimensions. This, of course, depends on the ability to include the desired extension in color space through which one ink may be distributed without including any that may be occupied by another.

Referring to FIGS. 1 and 3, which illustrate a preferred embodiment of the invention, a sample 20, the color of which is to be inspected, is shown as being placed in a color detection area in FIG. 1. Means for illuminating the sample may include lamps 21 and 22 which may consist of projection lamps, or quartz filament lamps where a greater degree of illumination is desired. Preferably, the illumination provides what would commonly be understood as "white" light, but it is not necessary that this light coincide with the ICI illuminant "C," nor is it necessary or desirable that this light contain equal amounts of red, blue, or green. However, it is desirable that the spectral distribution and amount of the light source remain substantially constant throughout any particular test sequence. Also, it is within the scope of this invention to use light not including all of the visible spectrum or light characterized by wave lengths outside the visible spectrum. Also, this invention is not limited to the recognition of reflected colors from a surface but may be applied to the recognition of colors in other kinds of samples. e.g., luminous, transparent, or translucent.

Optical means for gathering and directing light from the sample 20 for analysis may include an objective lens 25 positioned by its focal length from the sample 20 and projecting an image of a defined portion of the sample. An example of such a suitable optical system particularly designed to scan the surface of a relatively flat colored object is described and claimed in the copending application of Young, above. The three photomultiplying tubes comprising the transducers are identified at 28, 29 and 30 in FIG. 1. Optical means for dividing the light from the sample 20 and applying a portion of such light to each of the tubes includes a reflector 31 which is arranged for the convenience of redirecting the light from the lens 25, and beam sharing means consisting of a pair of additional clear glass reflectors 33 and 34. For example, the reflector 33 may consist of three sheets of clear glass providing six reflecting surfaces and is positioned to direct a portion of the light from the source 20 to the cathode of the first photomultiplying tube 28 and to transmit the remainder of the light to the second reflector 34. The second reflector 34 which may be two sheets of clear glass again divides the light by directing part of the light to the second photomultiplier tube 29 and permitting the remainder of the light to pass to the third photomultiplying tube 30. It is understood that the light to each of the tubes may be manipulated and directed, as desired, in order to make best use of the active area of the cathode of these tubes. A further arrangement which may be superior for some uses is to direct the light from the sample into an integrating sphere with a window provided for each transducer.

Means for applying to each of the tubes 28–30 chromatically differing components of light from the sample preferably takes the form of filters 38, 39 and 40 positioned respectively to intercept the light from the mirrors to the tubes 28, 29 and 30, although it is understood that other color separating means, such as color selective mirrors, may be used where a greater efficiency is desired. For example, filter 38 on the first tube 28 may be blue, the filter 39 on the second tube 29 may be green, and the filter 40 on the third tube 30 may be red. Each of the tubes 28–30 includes appropriate dynode supply circuits 42 which are preferably adjusted, together with an appropriate selection of the reflectors 33 and 34, so that the responses are substantially balanced and equal for each tube with a given change of reflectivity in spectral sample. For instance, the circuits 42 may be each adjusted to provide a one volt change in output with a change of black to white at the sample. In some instances unequal response to white may be desired where the system is to be distinguished between two colors having, say, equal blue components wherein the blue sensitivity is increased to provide a greater spread.

The electronic operating circuits further include preamplifiers 44 which are connected to receive the output of the tubes 28, 29 and 30. The preamplifiers may be adjusted to provide a —18 to —20 v. D.C. signal with an 0.8 v. input signal, for example.

The operating circuits further include a plurality of color recognition units 45 each of which consists of a plurality of acceptance circuits 46, 47 and 48, one for each of the photomultiplying tubes, and a coincidence circuit 50. The color recognition units 45 provide the means by which a limited range of colors in each of the R, G and B axes is defined (such as the pairs of planes 12, 13 and 14) and further provide the means by which the color element 15 at the intersection of these planes is defined. A single color recognition unit is effective to define the limits of a single discrete element within the color solid and to provide an indication of the occurrence of a color in such element, in the sample 20.

Additional color recognition units may be connected in parallel to the unit 45 for the purpose of independently and simultaneously recognizing the occurrence of colors lying within additional discrete elements 15 within the color solid. Such units may be adjusted so that the acceptance of the system is formed of contiguously or linearly arranged elements 15 for the purpose of recognizing a color over a linear variation of brightness, for example. Thus, the invention is useful in recognizing the occurrence of a particular color of ink on a printed surface and for additionally recognizing the occurrence of the overprinting of the ink with that of a different color and/or recognizing the same ink under conditions of varying densities. The output 52 from the coincidence circuit portion of the color recognition units 45 may be employed for the purpose of operating facsimilie reproducing equipment or for otherwise suitably signaling the occurrence of the desired color in the sample 20 under observation by the system.

Any suitable selective band pass circuit may be used for the acceptance circuits 46–48 and any suitable coincidence circuit may be employed for the circuits 50, which make up a color recognition unit 45. Preferably, the unit 45 is adjustable both as to the level of acceptance of the input signal and the range of acceptance thereof. A circuit which is particularly useful for this purpose by reason of the adjustability and accuracy is described and claimed in the copending application of Bradford, Serial No. 73,-280, filed concurrently herewith, now Patent No. 3,047,-811, and is illustrated in FIGS. 4 and 5, and assigned to the same assignee of this application. The output signals from the photomultiplying tubes 28–30, as amplified and inverted in the preamplifiers 44, are applied to the inputs 55, 56 and 57 of the acceptance cricuits, one of which is shown in detail in FIG. 4 for the "blue" tube 28. This signal is applied to the grid of a first amplifying stage consisting of a triode tube 60 through a voltage divider including resistors 61 and 62.

The tube 60 operates as an amplifier and a phase inverter, and the inverted form of the input voltage is directly applied to the input grid of a second triode tube 64 through signal proportioning resistors 65 and 66. The purpose of the resistors 65 and 66 is to reduce the output of the tube 60 in proportion to the gain of the tube so that the signal applied to the grid of the second tube 64 has substantially the same signal level, but in inverted relation, to the signal at the grid of the tube 60. The cathodes of the tubes 60 and 64 are connected to ground through a common cathode resistor 68, and their respective plates are connected to a source 69 of B+ through plate load resistors 70 and 71.

A diode 75 and current-limiting resistor 76 are connected in series between the plates of the first tube 60 and the second tube 64. The diode 75 therefore conducts throughout a portion of the range of the input voltage and forms, at the junction between the plate of the diode 75 and the resistor 76, a signal which uniformly increases to a peak and then decreases throughout a progressive change in the output of the associated photomultiplier tube. This signal at the diode 75 is applied to the grid of a third applifying stage consisting of a triode tube 80.

The triode tube 80 provides the output signal of the acceptance circuit 46 and also forms the input to the coincidence circuit 50. The cut-off voltage of the output tube 80 is adjustable in relation to its input to vary the width or range of acceptance in relation to the input signal at 55 by a potentiometer 81 which forms a "resolution" control for the system. The "resolution" control 81 determines tne tolerance of acceptance of the blue signal, or in other words, the spaced apart distance of the blue planes 14 in FIG. 3. The potentiometer 81 has its wiper connected to the cathode of the tube 80 and forms, with a fixed resistor 82, a voltage divider between the B+ source 69 and ground. Thus, the potentiometer 81 determines the voltage K and the point of conductance of the tube 30 in relation to the input signal D at the diode 75.

Means for adjusting the range of acceptance higher or lower in relation to the value of the input voltage consists of the voltage dividing network with a fixed resistor 85 and a potentiometer 86 which are connected between the B+ and ground. The wiper of the potentiometer 86 is connected to supply an adjustable voltage to the input grid of the tube 60 which is in subtractive relation to the input 55 from the preamplifier 42. This is the "selection" control by means of which the pair of blue planes 14 is positioned along the B axis.

The coincidence circuit 50 portion of the color recognition unit 45 consists of three substantially identical triode circuits each including a tube 80, with adjustable bias in the cathode circuits ("resolution" contol) for determining the width of acceptance, as described above. Each further includes an isolation diode 88 by means of which their plates are connected in common to a lead 89. The lead 89 is connected to the grid of a coincidence output tube 90 through a voltage divider consisting of the resistors 91, 92 and a potentiometer 93 which is connected to a source 94 of B—. The cathode of the tube 90 is grounded.

The operation of the acceptance and coincidence circuits can best be understood by reference to the voltage diagram of FIG. 5 where the input voltage to the first amplifying section, which may be taken as representing the input 55, is shown at A as uniformly sloping from a high to a low value, for the purpose of illustration. It is desired that a certain range of values of the voltage A be accepted and any voltage higher or lower than this range be rejected. This desired range is indicated at A' in FIG. 2 and corresponds electrically to the spaced apart distance of the planes 14. The input A is amplified and inverted by the tube 60 resulting in the signal indicated at B in FIG. 2. This signal is divided by the gain of the tube by the voltage divider consisting of the resistors 65 and 66 and is applied in inverted form at F to the second tube 64. The same thing in reverse takes place at the plate of the tube 64 and this is plotted by the line C.

The voltage represented by the broken line D is that measured at the plate of the diode 75, and it is also the signal applied to the grid of the tube 80. When the voltage at C is high and the voltage at B is low, the voltage at D will be the same as that at B since the diode 75 will be cut off and not conducting. As the voltage at B rises and C falls, a point is reached where the voltage at C is less than that at B and the diode then begins to conduct. Therefore, the voltage at D will decrease with the voltage at C due to the conduction of the diode while the voltage at B continues to rise. The resistor 76 limits the current through the diode 75 during conduction when B is greater than C.

It will therefore be seen that the voltage at D consists of a voltage which progressively increases to a peak value and then decreases with a progressive change of the input signal throughout the intended range designated at A' and applies this voltage to the grid of the tube 80. The bias of the tube 80 is adjusted at the "resolution" potentiometer 81 to provide a voltage K at its cathode defining thereby the cut-off point of the tube in relation to the voltage D. Accordingly, the range of conduction of the tube 80 (i.e., the acceptance) in relation to the input voltage A is determined by the setting of the voltage K at the potentiometer 81.

The voltage E at the plate of the tube 80 is normally high due to the fact that the tube is not conducting. However, during conduction throughout the range A', the voltage at E is sharply decreased, as indicated in FIG. 2.

During non-conduction of the tubes 80, the grid of the output tube 90 is held above cut-off by reason of the current flow through the isolation diodes 88 and the resistor 92 to ground. The conduction of any one or two of the tubes 80 at the range A' is not sufficient to cut off output tube 90. However, with the conduction of all of the three tubes 80, the flow through the resistor 92 is substantially decreased and the tube 90 is cut off, thus indicating the condition of coincidence of acceptance by the circuits 46, 47 and 48, signaling the detection of a color within the element 15. The sharp rise in voltage at the plate of the tube 90 is applied at 52 and provides the output of the system.

It is therefore seen that the adjustment of the "selection" potentiometer 85 determines the acceptance range of the color recognition unit 45 in relation to the blue signal and therefore determines the placement of the blue planes 14 on the B axis. The adjustment of the "resolution" potentiometer 81 determines the spaced apart distance of the planes 14. Similarly, the corresponding controls within the acceptance circuits 47 and 48 may be adjusted to define the dimensions of the element 15. It is understood that the highest degree of selection of the system results with the minimum of volume within the element 15, but the useful minimum is a function of the noise within the system.

In the overall operation of this invention, the system is set up to recognize a desired color by the placement of a sample 20 having the desired color in the field of the lens 25. The "resolution" and "selection" controls of one of the color recognition units 45 are adjusted to provide an output at 52. Experience will guide the setting of the "resolution" controls 81 which define the dimensions of the element 15. One or more of these conrols may be relaxed or tightened as necessary so as to provide acceptance of a desired color which may vary within prescribed limits and to exclude other colors present in the material at hand. The sample of the desired color is then removed and subsequent samples 20 are brought into inspection for the purpose of the recognition of a color falling within the defined element. Since the system does not depend upon visual comparison, and is entirely optical and electronic, it may be operated at a very high speed to observe a rapid succession of colors at the sample 20. Such may be effected by the rapid scanning system disclosed in the Young Patent No. 3,120,577 noted above.

Additional color recognition units 45 may be employed in parallel with the unit 45 described. They may be separately adjusted for the purpose of defining one or more additional elements 15 within the color space for the simultaneous recognition of colors falling in such elements. As noted above, this has particular advantage in the recognition of a color which may vary in density or which may be overprinted with another color. For example, one color recognition unit may be set to recognize brown ink and another brown and green in superposition. Thus one or the other will recognize the presence of brown ink whether it be alone or in superposition with green.

It is therefore seen that this invention provides a color recognition method and system which is highly versatile in its adjustability to recognize the occurrence of a desired color within a sample. Its operation does not require the quantitative analysis of the desired color and further does not depend upon visual observation for comparision with a standard. Since the system is allowed to memorize the colors for itself, the individual variations of tube transconductance, photomultiplier sensitivity, illumination efficiency and the like are of no importance since the system memorizes each color as it sees it.

While the method and form of apparatus herein described constitute preferred embodiments of the invention, it is to be understood that the invention is not limited to this precise method and form of apparatus, and that changes may be made therein without departing from the scope of the invention which is defined in the appended claims.

What is claimed is:

1. Color detecting and signaling apparatus for providing a first characteristic signal whenever the observed color of a sample falls anywhere within a sharply defined color element and for providing another characteristic signal at all other times, comprising a plurality of photoelectric transducers, each responsive to a chromatically differing component of light from a sample and each providing a separate output which varies substantially in accordance with the intensity of the associated said chromatic component received from said sample, means for applying light from said sample to each of said transducers, a separate band pass circuit connected to receive the output of each of said transducers and each having a band pass the width of which effectively defines one dimension of said color element and the acceptance level of which in relation to the output of the associated said transducer defines the position of said color element in the corresponding dimension of color space and each operable to provide an output which remains substantially invariant as long as the input thereto from the associated transducer remains within said pass band, and a coincidence circuit having separate inputs each connected respectively to receive the output of one of said band pass circuits and operable to form said first signal upon the occurence of simultaneous outputs from each of said band pass circuits signaling the occurrence of a color from said sample somewhere within said color element and further forming said another signal at all other times indicating the absence of color from said sample within said color element.

2. The apparatus of claim 1 in which at least one of said band pass circuits includes means for adjusting the width of acceptance thereof in relation to the output of its associated said transducer for varying the size of one dimension of said color element.

3. The apparatus of claim 1 in which at least one of said band pass circuits includes means for adjusting the level of acceptance thereof in relation to the output of its associated said transducer for varying the position of one dimension of said color element.

4. Color detecting and signaling apparatus for providing a first characteristic signal whenever the observed color of a sample falls anywhere within a sharply defined three dimensional color element and for providing another characteristic signal differing from said first signal at all other times, comprising three photoelectric transducers, each responsive to a chromatically differing component of light from a sample and each providing a separate output which varies substantially in accordance with the intensity of the associated said chromatic component received from said sample, means for applying light from said sample to each of said transducers, a separate band pass circuit connected to receive the output of each of said transducers and each having a band pass the width of which effectively defines one dimension of said color element and the acceptance level of which in relation to the output of the associated said transducer defines the position of said color element in the corresponding dimension of color space and each operable to provide an output which remains substantially invariant only as long as the input thereto from the associated transducer remains within said pass band, and a coincidence circuit having separate inputs each connected respectively to receive the output of one of said band pass circuits and operable to form said first signal upon the occurence of simultaneous outputs from each of said band pass circuits signaling the occurence of a color from said sample somewhere within said color element and further forming said another signal at all other times indicating the absence of a color from said sample within said color element.

5. The apparatus of claim 4 in which each of said band pass circuits includes means for adjusting the width of acceptance thereof in relation to the output of its associated said transducer for varying the size of said color element and each further includes means for adjusting the level of acceptance thereof for varying the position of said element in color space.

References Cited by the Examiner
UNITED STATES PATENTS

| | | | |
|---|---|---|---|
| 2,007,651 | 7/35 | Ives | 250—226 |
| 2,720,811 | 10/55 | Sziklai | 88—14 |
| 2,882,786 | 4/59 | Kaye | 250—226 |
| 2,910,909 | 11/59 | Stone | 88—14 |
| 2,951,985 | 9/60 | Hudson et al. | 378—110 |
| 2,991,369 | 7/61 | Greive | 250—226 |
| 2,992,331 | 7/61 | Bonner et al. | 250—71.5 |
| 3,003,388 | 10/61 | Hunter et al. | 88—14 |
| 3,060,790 | 10/62 | Ward | 250—226 |

FOREIGN PATENTS 493,221 1/50 Belgium.

FREDERICK M. STRADER, *Primary Examiner.*

ARCHIE R. BORCHELT, RICHARD M. WOOD, RALPH G. NILSON, *Examiners.*